United States Patent
Petot et al.

(10) Patent No.: US 11,426,813 B2
(45) Date of Patent: *Aug. 30, 2022

(54) WELDING OR ADDITIVE MANUFACTURING DUAL WIRE DRIVE SYSTEM

(71) Applicant: Lincoln Global, Inc., Santa Fe Springs, CA (US)

(72) Inventors: Bradford W. Petot, South Euclid, OH (US); Elliott R. Ash, Bay Village, OH (US); Kent R. Johns, Hudson, OH (US); Vincent D. Casella, Wickliffe, OH (US); Steven R. Peters, Huntsburg, OH (US); Alexander C. Mehlman, Strongsville, OH (US); Matthew A. Weeks, Walloon (AU)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/527,328

(22) Filed: Jul. 31, 2019

(65) Prior Publication Data

US 2020/0114448 A1    Apr. 16, 2020

Related U.S. Application Data

(63) Continuation-in-part of application No. 16/159,805, filed on Oct. 15, 2018, now Pat. No. 11,198,192.

(Continued)

(51) Int. Cl.
*B23K 9/04* (2006.01)
*B23K 9/16* (2006.01)
(Continued)

(52) U.S. Cl.
CPC .............. *B23K 9/042* (2013.01); *B23K 9/164* (2013.01); *B23K 9/1735* (2013.01); *B23K 9/287* (2013.01); *B23K 9/325* (2013.01)

(58) Field of Classification Search
CPC ........ B23K 9/04; B23K 9/042; B23K 9/1336; B23K 9/164; B23K 9/1735; B23K 9/287; B23K 9/325

See application file for complete search history.

(56) References Cited

U.S. PATENT DOCUMENTS 3,167,636 A    1/1965   Bosteels
3,694,620 A    9/1972   Gleason
(Continued)

FOREIGN PATENT DOCUMENTS

CN    104096948 A    10/2014
CN    204339099 U    5/2015
(Continued)

OTHER PUBLICATIONS

Extended European Search Report from Corresponding Application No. 19203369.4; dated Jul. 31, 2020; pp. 1-8.

(Continued)

*Primary Examiner* — Justin C Dodson
*Assistant Examiner* — Dilnessa B Belay
(74) *Attorney, Agent, or Firm* — Brad C. Spencer

(57) ABSTRACT

A welding or additive manufacturing wire drive system includes a first spindle for a first welding wire spool, a second spindle for a second welding wire spool, a first drive roll, and a second drive roll. One or both of the drive rolls has a circumferential groove. A first welding wire and a second welding wire are located between the first drive roll and the second drive roll in the circumferential groove. The first welding wire contacts the second welding wire between the first drive roll and the second drive roll. The first welding (Continued)

wire further contacts a first sidewall portion of the circumferential groove. The second welding wire further contacts a second sidewall portion of the circumferential groove. Both of the first welding wire and the second welding wire are radially offset from a central portion of the circumferential groove.

11 Claims, 9 Drawing Sheets

Related U.S. Application Data

(60) Provisional application No. 62/815,036, filed on Mar. 7, 2019.

(51) Int. Cl.
*B23K 9/32* (2006.01)
*B23K 9/28* (2006.01)
*B23K 9/173* (2006.01)

(56) References Cited

U.S. PATENT DOCUMENTS

| | | | | |
|---|---|---|---|---|
| 5,782,987 | A * | 7/1998 | Furman | B23K 9/1336 219/136 |
| 5,816,466 | A | 10/1998 | Seufer | |
| 6,066,833 | A | 5/2000 | Rigdon et al. | |
| 6,374,655 | B1 * | 4/2002 | Hresc | B21F 11/00 72/142 |
| 8,278,599 | B2 | 10/2012 | Patterson | |
| 8,569,653 | B2 | 10/2013 | Enyedy | |
| 9,517,524 | B2 | 12/2016 | Miller | |
| 9,839,970 | B2 | 12/2017 | Peters et al. | |
| 10,010,962 | B1 | 7/2018 | Gelmetti et al. | |
| 2005/0224486 | A1 * | 10/2005 | Matiash | B23K 9/1336 219/137.7 |
| 2008/0156783 | A1 | 7/2008 | Vanden Heuvel et al. | |
| 2010/0314373 | A1 * | 12/2010 | Patterson | B65H 51/14 219/136 |
| 2011/0309062 | A1 | 12/2011 | O'Donnell et al. | |
| 2012/0152921 | A1 * | 6/2012 | Peters | B23K 9/123 219/137 R |
| 2013/0292366 | A1 | 11/2013 | Enyedy et al. | |
| 2013/0334188 | A1 | 12/2013 | Enyedy et al. | |
| 2015/0209905 | A1 | 7/2015 | Matthews et al. | |

FOREIGN PATENT DOCUMENTS

| | | |
|---|---|---|
| CN | 105658368 A | 6/2016 |
| DE | 44 20 706 A1 | 12/1995 |
| DE | 196 11 597 A1 | 9/1997 |
| JP | S51-44542 A | 4/1976 |
| JP | H02-258168 A | 10/1990 |
| JP | H05-111769 A | 5/1993 |
| JP | H09-267170 A | 10/1997 |
| JP | H10-58142 A | 3/1998 |
| JP | H10-113771 A | 5/1998 |
| JP | 3739870 B2 | 1/2006 |
| KR | 200455348 Y1 | 8/2011 |
| WO | 2012/153177 A1 | 11/2012 |

OTHER PUBLICATIONS

Extended European Search Report from Corresponding Application No. EP19203389.2; dated Jun. 22, 2020; pp. 1-9.
Shi, et al.; "Physical Characteristics of Twin-Wire Indirect Arc Plasma;" Vacuum; vol. 107; Dated Apr. 3, 2014; pp. 41-50.
Extended European Search Report from Corresponding U.S. Appl. No. 19/205,296 7; dated Aug. 13, 2020; pp. 1-13.
Extended European Search Report from Corresponding U.S. Appl. No. 19/205,356 9; dated Aug. 13, 2020; pp. 1-9.
Kemppi; "ArcFeed 200, 300, 300P, 300RC Operating Manual"; https://resources.userdoc.kemppi.com/manuals/kemppi-arcfeed-omen.pdf; Accessed Jul. 5, 2018; pp. 1-20.
Castolin Eutectic; "CastoMIG 350C and DS"; https://ecitydoc.com/download/strangerwith-castolin-eutectic-welding-equipment-catalogue_pdf; Dated Jan. 29, 2018; pp. 1-52.
Misumi; "Guide Roller (V Type, Single Bearing) (GRL-SH1-V)"; https://my.misumi-ec.com/vona2/detail/221000383638/?CategorySpec=00000196577%3a%3ad; Accessed Jul. 5, 2018; pp. 1-5.
EWM AG; "MIG/MAG Primer"; Dated Nov. 2015; p. 94.

* cited by examiner

WELDING OR ADDITIVE MANUFACTURING DUAL WIRE DRIVE SYSTEM

CROSS-REFERENCE TO RELATED APPLICATIONS

The present application is a continuation-in-part of U.S. patent application Ser. No. 16/159,805, filed on Oct. 15, 2018, the disclosure of which is incorporated herein by reference. The present application claims priority to U.S. Provisional Patent Application Ser. No. 62/815,036, filed on Mar. 7, 2019, the disclosure of which is incorporated herein by reference.

BACKGROUND OF THE INVENTION

Field of the Invention

Devices, systems, and methods consistent with the invention relate to material deposition with a dual wire configuration.

Description of Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover a wider weld gap or to increase a wire deposition rate. In both cases, it is common to use an increased electrode diameter. The increased diameter will result in both an elongated and widened weld puddle, even though it may be desired only to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation because of the larger diameter of the electrode used. Further, it may create a weld bead profile or cross-section that is not ideal for certain mechanical applications. Rather than increasing the diameter of the electrode, it may be desirable to use two smaller electrodes simultaneously.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding or additive manufacturing wire drive system. The system includes a first spindle for a first welding wire spool, a second spindle for a second welding wire spool, a first drive roll, and a second drive roll, wherein one or both of the first drive roll and the second drive roll has a circumferential groove. A first welding wire, from the first welding wire spool, is located between the first drive roll and the second drive roll in the circumferential groove. A second welding wire, from the second welding wire spool, is located between the first drive roll and the second drive roll in the circumferential groove. The first welding wire contacts the second welding wire between the first drive roll and the second drive roll. The first welding wire further contacts a first sidewall portion of the circumferential groove. The second welding wire further contacts a second sidewall portion of the circumferential groove. Both of the first welding wire and the second welding wire are radially offset from a central portion of the circumferential groove.

In accordance with another aspect of the present invention, provided is a welding or additive manufacturing wire drive system. The system includes a first spindle for a first welding wire spool and a second spindle for a second welding wire spool. A first drive roll has a first circumferential groove comprising a first inner sidewall, a first outer sidewall, and a first concave groove base extending between the first inner sidewall and the first outer sidewall. A second drive roll has a second circumferential groove comprising a second inner sidewall, a second outer sidewall, and a second concave groove base extending between the second inner sidewall and the second outer sidewall. The second circumferential groove is aligned with the first circumferential groove. A first welding wire, from the first welding wire spool, is located between the first drive roll and the second drive roll in both of the first circumferential groove and the second circumferential groove. A second welding wire, from the second welding wire spool, is located between the first drive roll and the second drive roll in both of the first circumferential groove and the second circumferential groove. A biasing member biases the first drive roll toward the second drive roll to force the first welding wire to contact the second welding wire. The first welding wire contacts each of the first inner sidewall, the second inner sidewall, and the second welding wire. The second welding wire contacts each of the first outer sidewall, the second outer sidewall, and the first welding wire. The first welding wire and the second welding wire are offset from both of the first concave groove base and the second concave groove base.

In accordance with another aspect of the present invention, provided is a welding or additive manufacturing wire drive system. The system includes a reel stand comprising a first spindle for a first welding wire spool, and a second spindle for a second welding wire spool. The first welding wire spool is located above the second welding wire spool on the reel stand. A first drive roll has a first annular groove, and a second drive roll has a second annular groove that is aligned with the first annular groove. A first welding wire, from the first welding wire spool, is located between the first drive roll and the second drive roll in both of the first annular groove and the second annular groove. A second welding wire, from the second welding wire spool, is located between the first drive roll and the second drive roll in both of the first annular groove and the second annular groove. A biasing member biases the first drive roll toward the second drive roll to clamp the first welding wire and the second welding wire between the first drive roll and the second drive roll. The first drive roll and the second drive roll rotate to simultaneously payout the first welding wire from the first welding wire spool and payout the second welding wire from the second welding wire spool. The first welding wire spool and the second welding wire spool rotate in opposite directions during payout.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
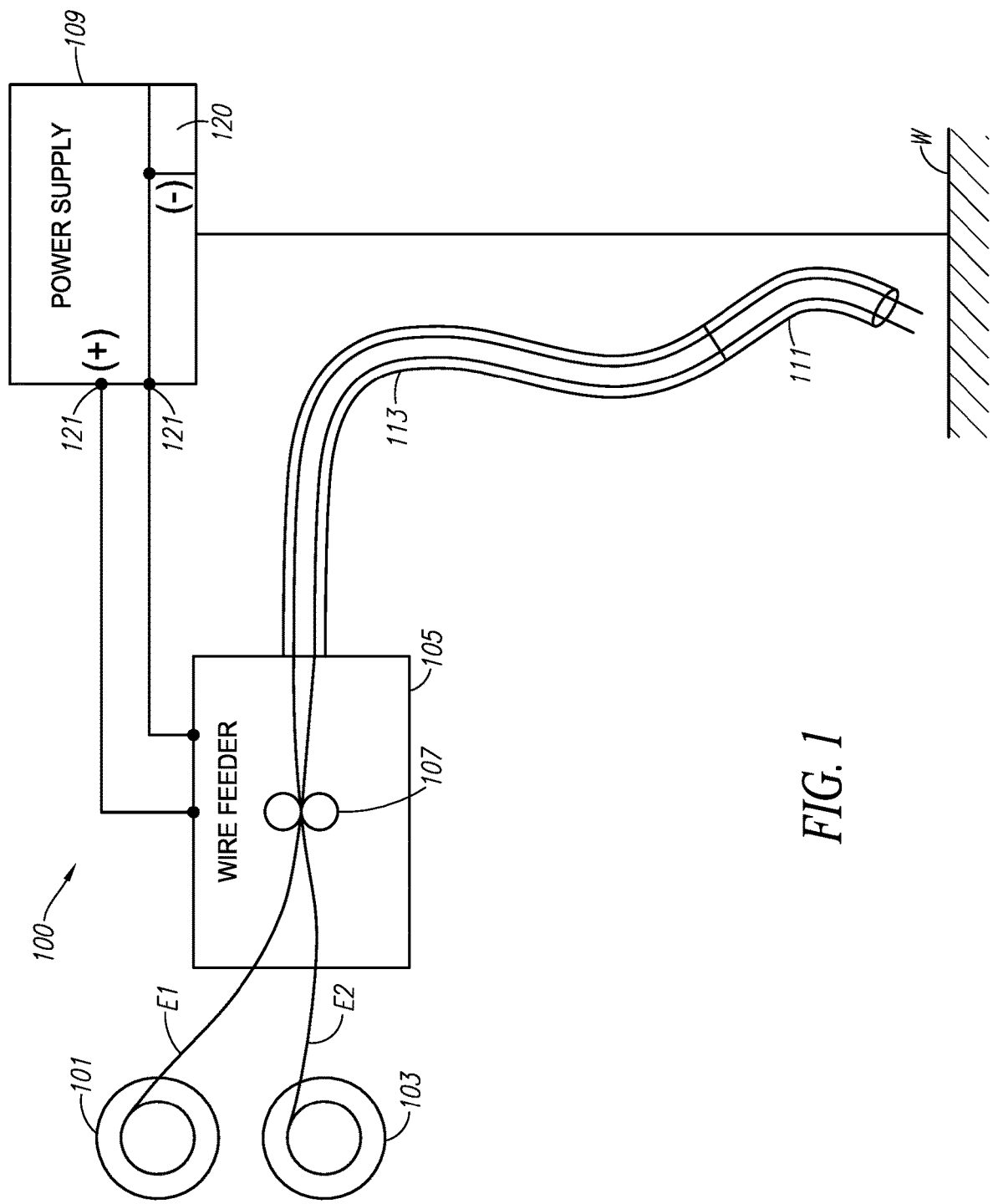
FIG. 1 is a schematic diagram of an example welding system.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Embodiments of the present invention are described herein in the context of a welding system. Example welding systems include gas metal arc welding (GMAW) systems, submerged arc welding (SAW) systems, flux-cored arc welding (FCAW) systems, metal-cored arc welding (MCAW) systems, and the like. Further, while the electrodes described herein can be solid electrodes, embodiments of the present invention are not limited to the use of solid electrodes. For example, flux-cored electrodes and metal-cored electrodes can also be used without departing from the spirit or scope of the present invention. Further, embodiments of the present invention can also be used in manual, semi-automatic and robotic welding operations. Because such systems are well known, they will not be described in detail herein.

Embodiments of the present invention will be discussed in the context of a welding system. However, in addition to welding operations, embodiments can be used in additive manufacturing processes and other welding-type processes involving driven wire electrodes (e.g., hardfacing).

Turning now to the Figures, FIG. 1 depicts an exemplary embodiment of a welding system 100. The welding system 100 contains a welding power source or power supply 109 which is coupled to both a welding torch 111 and a wire feeder 105. The power source 109 can be any known type of welding power source capable of delivering welding current and welding waveforms, for example, pulse spray, STT and/or short arc type welding waveforms. Because the construction, design and operation of such power supplies are well known, they need not be described in detail herein. It is also noted that welding power can be supplied by more than one power supply at the same time—again the operation of such systems are known. The power source 109 can also include a controller 120 which is coupled to a user interface to allow a user to input control or welding parameters for the welding operation. The controller 120 can have a processor, CPU, memory etc. to be used to control the operation of the welding process and the generation of welding waveforms. The torch 111, which can be constructed similar to known manual, semi-automatic or robotic welding torches and can be of a straight or gooseneck type. The wire feeder 105 draws wire electrodes E1 and E2 from electrode sources 101 and 103, respectively, which can be of any known type, such as reels, spools, containers or the like. The wire feeder 105 employs drive rolls 107 to draw the electrodes or welding wires E1 and E2 and push or pull the electrodes to the torch 111. Details of the drive rolls 107 are discussed further below. The drive rolls 107 and wire feeder 105 are configured for a dual electrode welding operation. That is, they supply both electrodes E1 and E2 simultaneously to the torch 111 for creating an arc and welding the workpiece W. As shown, the wire feeder 105 is operatively connected to the power source 109 consistent with known configurations of welding operations.

Once driven by the drive rolls 107, the electrodes E1 and E2 can be passed through a liner 113 to deliver the electrodes E1 and E2 to the torch 111. The liner 113 is appropriately sized to allow for the passage of the electrodes E1 and E2 to the torch 111. For example, for two 0.030 inch diameter electrodes, a standard 0.0625 inch inside diameter liner 113 (which is typically used for a single 0.0625 inch diameter electrode) can be used with no modification.

In certain embodiments, the wire electrodes E1, E2 can have different diameters. That is, embodiments of the present invention can use an electrode of a first, larger, diameter and an electrode of a second, smaller, diameter. In such an embodiment, it may be possible to more conveniently weld two workpieces of different thicknesses. For example, the larger electrode can be oriented to the larger workpiece while the smaller electrode can be oriented to the smaller workpiece. Further, embodiments of the present invention can be used for many different types of welding operations including, but not limited to, GMAW, SAW, FCAW, and MCAW. Additionally, embodiments of the present invention can be utilized with different electrode types. For example, it is contemplated that a cored electrode (e.g., flux-cored or metal-cored) can be coupled with a non-cored or solid electrode. Further, electrodes of differing compositions can be used to achieve desired weld properties and composition of the final weld bead. Two different, but compatible, consumables can be combined to create a desired weld joint. For example, compatible consumables such as hardfacing wires, stainless wires, nickel alloys and steel wires of different composition can be combined. As one specific example, a mild steel wire can be combined with an over-alloyed wire to make a 309 stainless steel composition. This can be advantageous when a single consumable of the type desired does not have desirable weld properties. For example, some consumables for specialized welding provide the desired weld chemistry but are extremely difficult to use and have difficulty providing a satisfactory weld. However, embodiments of the present invention allow for the use of two consumables that are easier to weld with to be combined to create the desired weld chemistry. Embodiments of the present invention can be used to create an alloy/deposit chemistry that is not otherwise commercially available, or is otherwise very expensive to manufacture. Thus, two different consumables can be used to obviate the need for an expensive or unavailable consumable. Further, embodiments can be used to create a diluted alloy. For example, a first welding wire could be a common, inexpensive alloy and a second welding wire could be a specialty wire. The resulting deposit would be the average of the two wires, mixed well in the formation of a molten droplet, at the lower average cost of the two wires over an expensive specialty wire. Further, in some applications, the desired deposit could be unavailable due to the lack of appropriate consumable chemistry, but could be achieved by mixing two standard alloy wires, mixed within the molten droplet and deposited as a single droplet. Further, in some applications, such as the application of wear resistance metals, the desired deposit may be combination of tungsten carbide particles from one wire and chromium carbide particles from another. Still in another application, a larger wire housing larger particles within is mixed with a smaller wire containing fewer particles or smaller particles, to deposit a mixture of the two wires. Here the expected contribution from each of the wires is proportional to the size of wire. Further, although exemplary embodiments are discussed herein utilizing two wire electrodes simultaneously, other embodiments of the present invention can utilize more than two electrodes. For example, it is contemplated that a three or more electrode configuration can be utilized consistent with the descriptions and discussions set forth herein.

Figure 2:
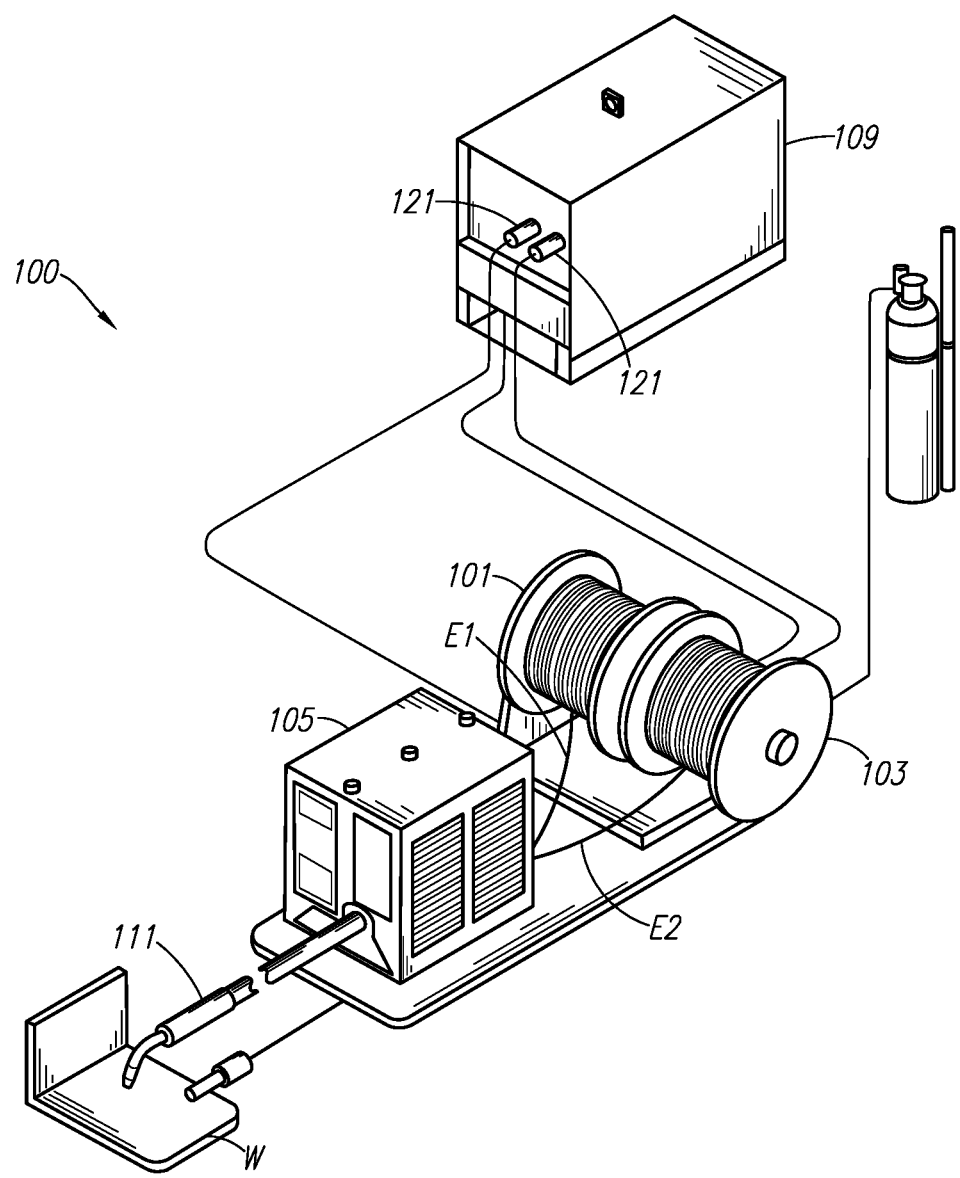
FIG. 2 is a perspective view of an example welding system.

FIG. 2 provides a perspective view of the welding system 100. The wire feeder 105 comprises drive rolls for conveying wire electrodes E1, E2 from electrode sources 101, 103, for use in a particular application. The wire electrodes E1, E2, may be drawn continuously from a reel, spool, or container (e.g., a box or a drum), and delivered to the workpiece W, which in the current embodiment is a weldment. The wire feeder 105 may include a drive assembly that utilizes power from one or more locomotive devices, such as an electric motor, that drive the wire electrodes E1, E2 to the application work site or workpiece W.

The welding power source 109 may receive electrical input power from an outside source (e.g., utility power), that is directed to an onboard transformer and processor-controlled inverter or chopper circuitry, not depicted in the figures. Output from the power source 109 may be provided through welding output terminals 121 or studs of the welding power source. A welding gun or torch 111 and wire conduit may be electrically connected to the welding power source 109 through the welding wire feeder 105 for delivering welding current to the workpiece W in a manner known in the art. It follows that the welding wires E1, E2 are fed through the torch 111 and metered out, i.e. dispensed, at the discretion of the application and/or end user in any manner suitable for conducting the welding process. It is noted that the electrodes E1, E2 conduct electricity for establishing a welding arc, wherein the electrodes are conveyed to the workpiece W having a voltage potential equal to or approximately equal to the output voltage of the welding power source 109, which may be substantially greater than ground.

Different modes of conveying the wire electrodes E1, E2 are known in the art, an example of which includes pushing the electrodes to the torch 111 via power or torque provided by the locomotive device. Other modes of conveying the electrodes include push/pull modes that utilize multiple locomotive devices. The electrodes E1, E2 are delivered to the torch 111, which may have a trigger or other activation mechanism for dispensing the electrodes at the user's discretion. At times, it may be necessary to deliver the electrodes E1, E2 at varying rates of feed. Therefore, the locomotive device has an output that is adjustable for varying the wire feed speed (WFS) of the electrodes E1, E2. In particular, a drive motor of the wire feeder 105 may be a variable speed motor to adjust the WFS.

Figure 3:
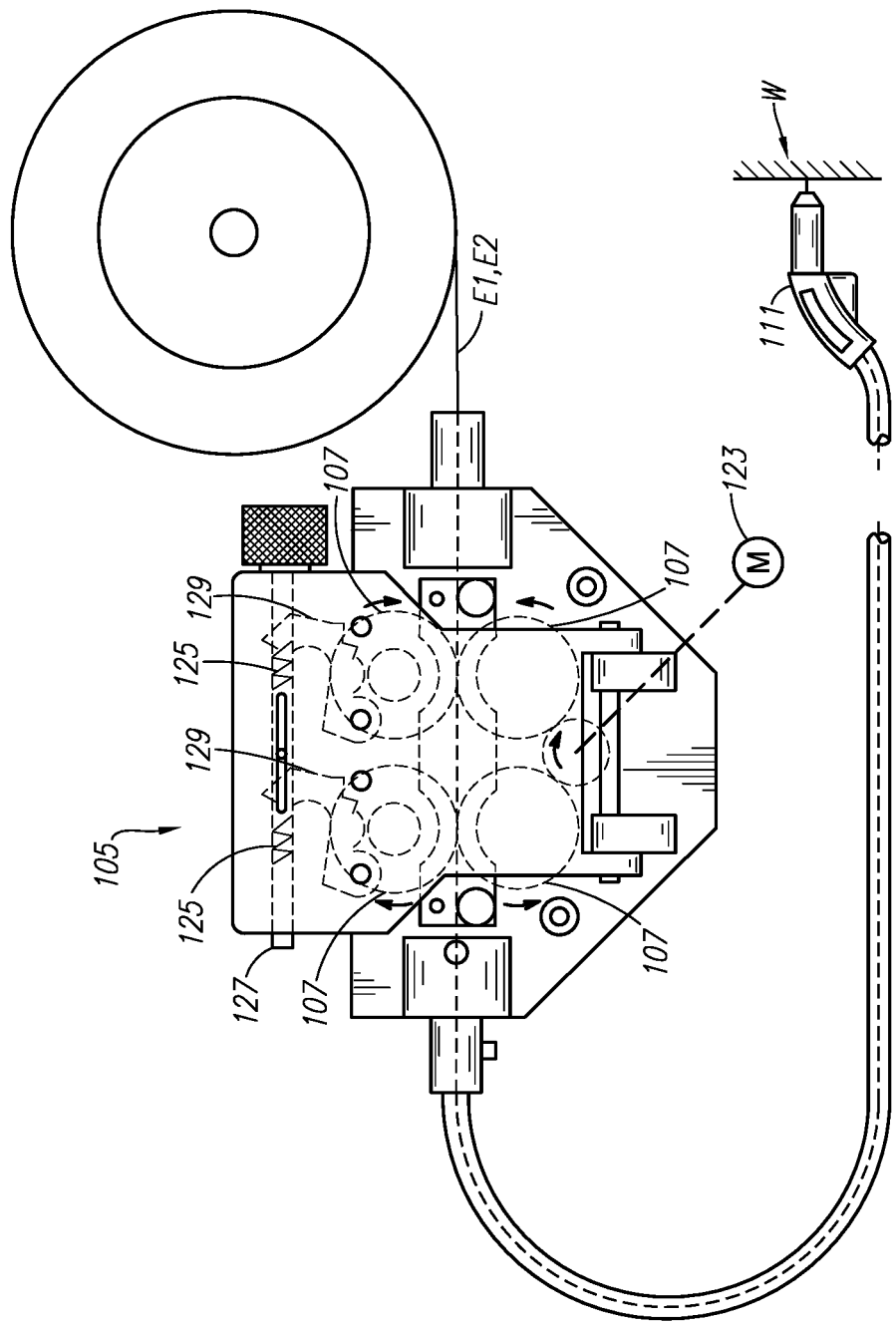
FIG. 3 is a side view of an example wire feeder.

A drive motor 123 is shown in FIG. 3. The wire feeder 105 and/or drive motor(s) 123 may draw operating power from the welding power source 109, or an altogether separate power source. Any manner of providing power to operate the welding wire feeder 105 and/or the drive motors 123 may be chosen with sound engineering judgment as is appropriate for use with the embodiments of the present invention.

Referring to FIGS. 2 and 3, the welding wire feeder 105 may include a drive assembly, or drive roll assembly. As mentioned above, the drive motor 123, also called a wire feeder motor, delivers power, i.e. torque, to convey the first and second welding wires E1, E2 through the wire feeder and to the torch 111 and subsequently to the workpiece W. Drive rolls 107 are included that grip the welding wires E1, E2 for pushing or pulling the welding wires in the appropriate direction, i.e. toward the workpiece W. Sets of drive rolls 107 are vertically aligned and have corresponding aligned annular or circumferential grooves through which the welding wires E1, E2 pass simultaneously. It can be seen that the vertically-aligned sets of drive rolls 107 rotate in opposite directions to drive the welding wires E1, E2 through the wire feeder 105. For example, in FIG. 3, the upper drive rolls 107 rotate clockwise and the lower drive rolls rotate counterclockwise. The drive rolls 107 may be cylindrical in configuration, or more specifically disk-shaped, although the particular configuration should not be construed as limiting. The surface, i.e. the outer circumference, of the driver rolls 107 may be comprised of a sufficiently hardened material, like steel, that is durable and suitable for gripping the welding wires E1, E2. As shown, the drive rolls 107 may be disposed in pairs along the wire trajectory with each drive roll of the pair being supported on opposing sides of the welding wires E1, E2, such that respective outer circumferential portions of the rolls engage opposite sides of the wires (e.g., from above and below). It is noted that the central axes of respective drive rolls 107 extend substantially parallel with one another and generally transverse to the trajectory of the welding wires E1, E2.

The wire feeder 105 can include a biasing member that biases the vertically-aligned sets of drive rolls 107 toward one another. The biasing member sets the clamping force or compression that the drive rolls 107 apply to the welding wires E1, E2. For example, the wire feeder 105 can include biasing springs 125 that apply a bias force to one or more drive rolls 107 to set the compression that the drive rolls apply to the welding wires E1, E2. In the example embodiment of FIG. 3, the biasing springs 125 are mounted to an adjusting rod 127 that can be moved inward and outward to adjust the compression of the biasing springs 125. The force of the biasing springs 125 is transferred to the upper drive rolls 107 via pivoting levers 129. As noted above, the vertically-aligned sets of drive rolls 107 have corresponding aligned annular or circumferential grooves through which the welding wires E1, E2 pass simultaneously. That is, the welding wires E1, E2 are located together in the grooves of an upper drive roll and a lower drive roll. The welding wires E1, E2 are squeezed or compressed within the grooves by the bias force applied by the biasing springs 125 to the drive rolls 107. As will be explained further below, the welding wires E1, E2 are made to contact each other within the grooves when squeezed by the drive rolls 107. In addition to an upward/downward compressive force applied to the welding wires E1, E2, a sideways compressive force is also applied to the welding wires E1, E2 to force them together inside of the grooves. The sideways compressive force is provided through the shape of the sidewalls of the grooves.

Figure 4:
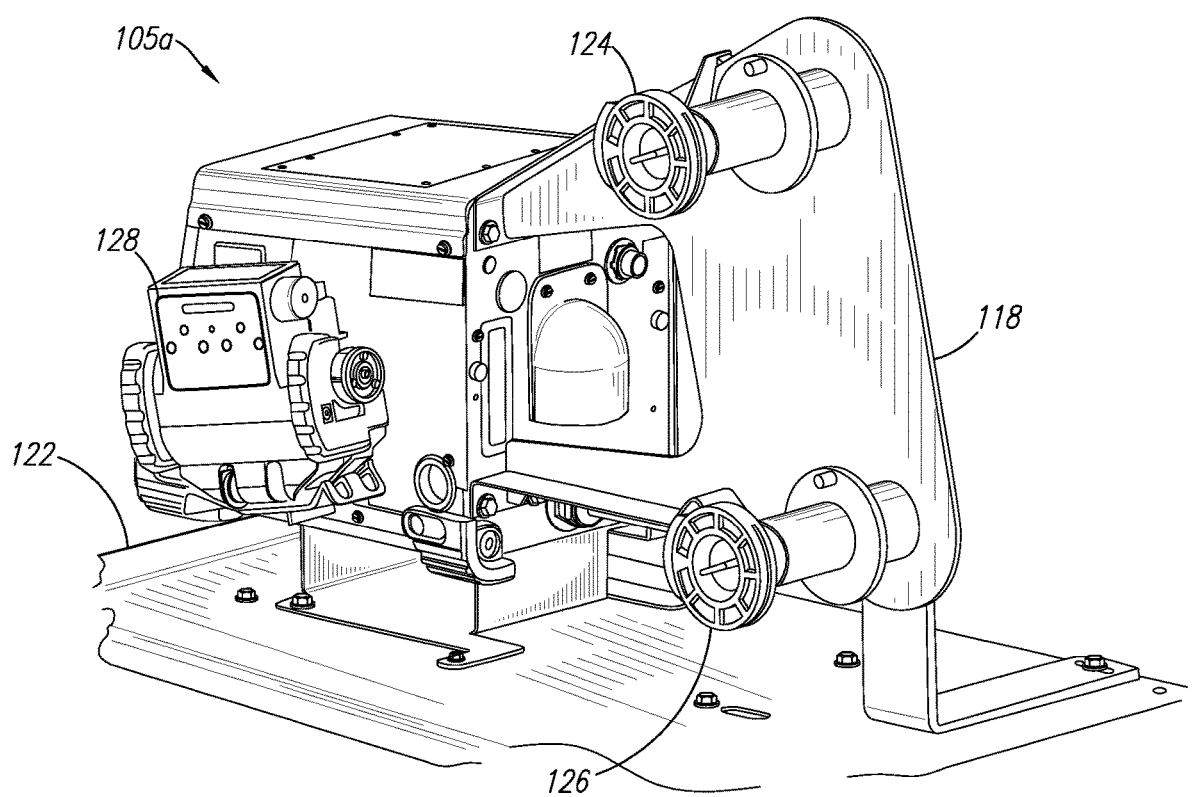
FIG. 4 is a perspective view of an example wire feeder.
Figure 5:
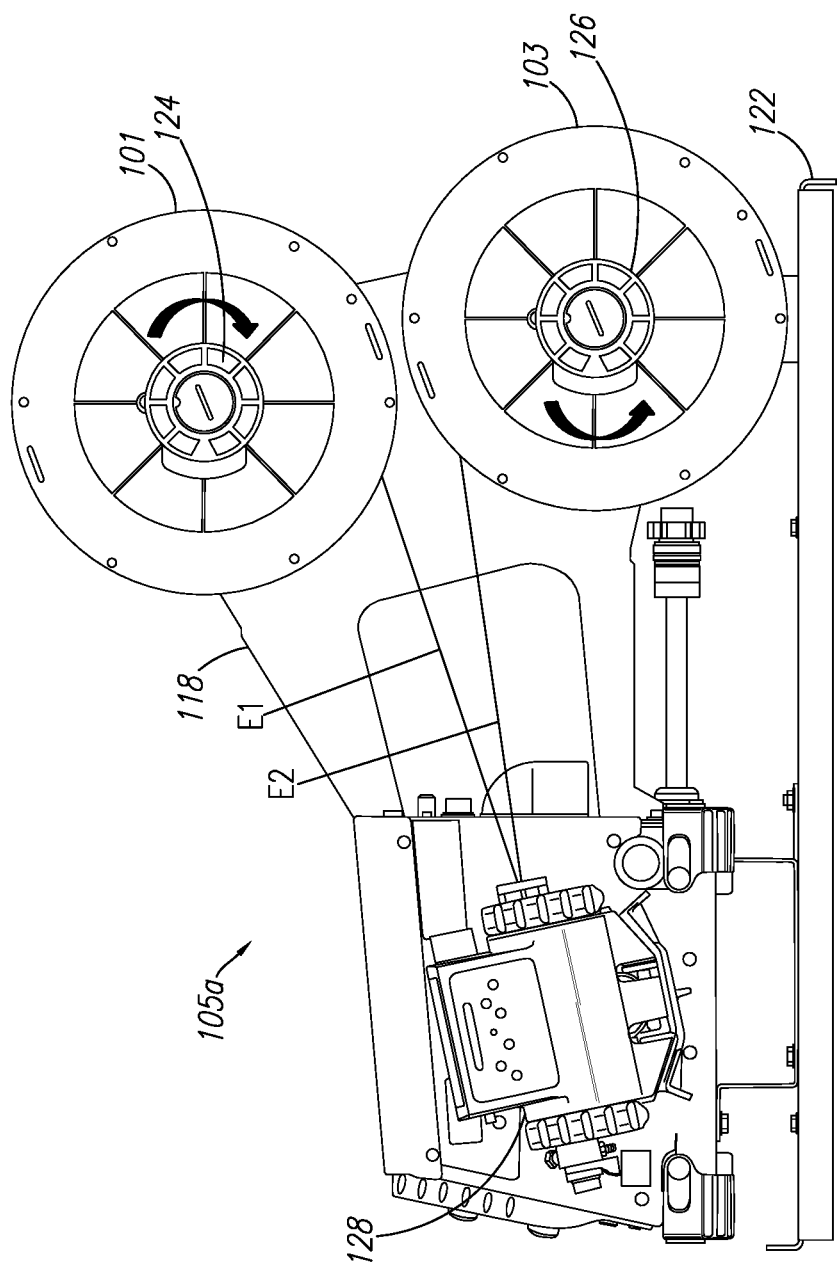
FIG. 5 is a side view of an example wire feeder.

FIGS. 4 and 5 show a wire feeder 105a having an attached reel stand 118 for multi-wire welding applications. The wire feeder 105a has a common base 122 and the wire feeder and reel stand 118 are attached (e.g., bolted, screwed, etc.) to each other and to the common base. The reel stand 118 has at least two spindles 124, 126 for supporting respective welding wire spools 101, 103 upon which the welding wires E1, E2 are wound. A motor and drive roll assembly 128 (e.g., as discussed above with respect to FIG. 3) can deliver both welding wires E1, E2 simultaneously to the welding torch. The welding wires E1, E2 can have the same diameter and composition or have different diameters and/or compositions as discussed above.

The spindles 124, 126 and wire spools 101, 103 are easily accessible by an operator. The spools 101, 103 can be individually removed and replaced without disturbing the other spool. The ready access provided by the reel stand 118 can allow an operator to quickly change spools with minimal interruption to a deposition operation (e.g., welding, additive manufacturing, etc.)

In FIGS. 4 and 5, the spindles 124, 126 project laterally from the reel stand 118 in the same direction and are located on a common lateral side of the reel stand behind the motor and drive roll assembly 128. The upper spindle 124 is located higher on the reel stand 118 than the lower spindle 126, and the upper spool 101 is located above the lower spool 103. When the drive rolls in the motor and drive roll assembly 128 rotate, the welding wires E1, E2 are simultaneously payed out from the spools 101, 103. Depending on how the spools 101, 103 are oriented on the spindles 124, 126, the spindles and spools can rotate in opposite directions or in the same direction. In FIG. 5, the upper spindle 124 and spool 101 will rotate clockwise during payout, and the lower spindle 126 and spool 103 will rotate counterclockwise. Such a configuration will allow both of the welding wires E1, E2 to be fed into the motor and drive roll assembly 128 at a moderate angle with respect to the feeding direction of the motor and drive roll assembly.

Figure 6:
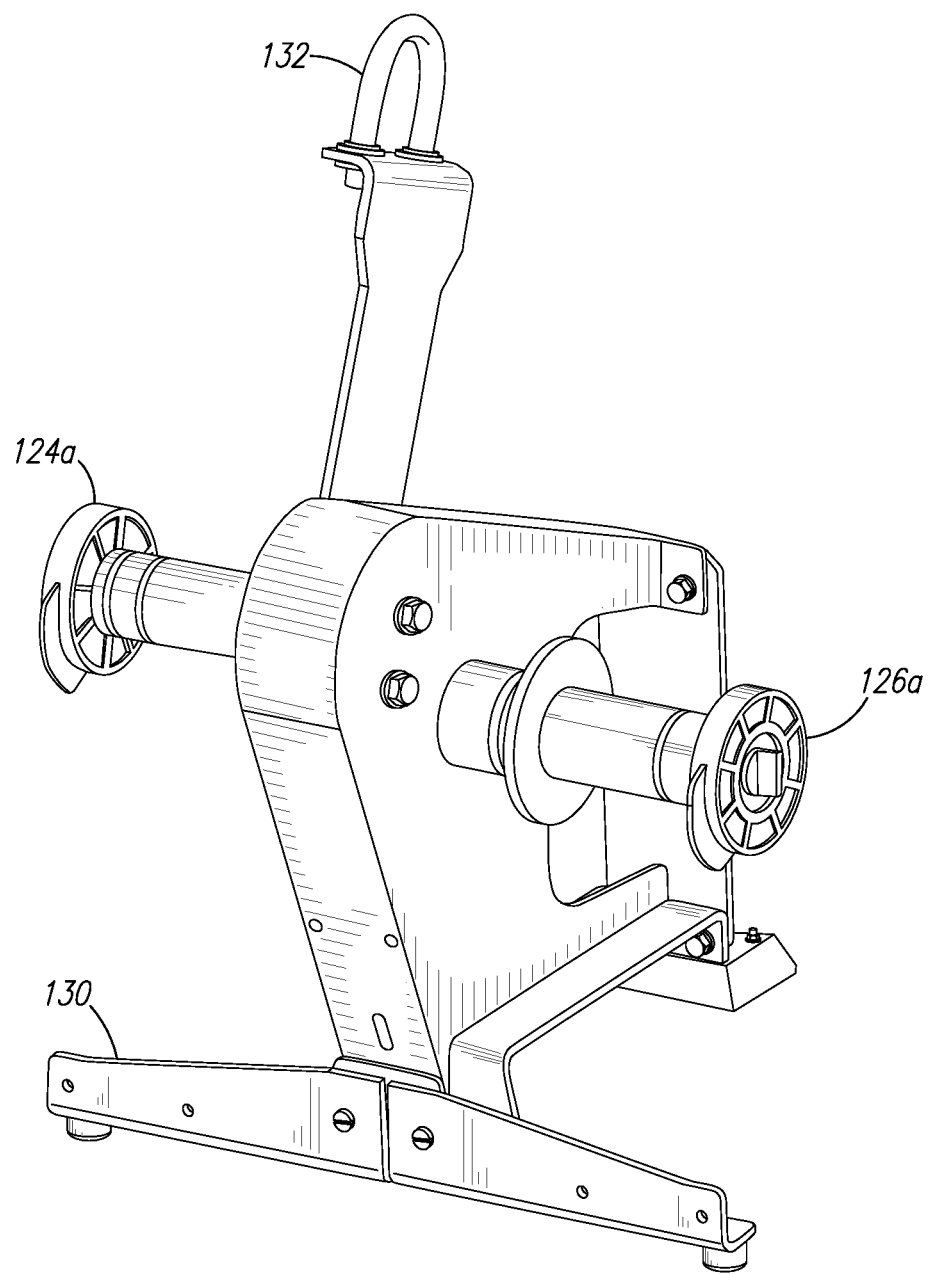
FIG. 6 is a perspective view of an example reel stand.

Spindles can also be located on opposite lateral sides of a reel stand, to project in opposite lateral directions. An example of such a reel stand 130 is shown in FIG. 6. The reel stand 130 in FIG. 6 is a free standing reel stand that is not structurally attached to the wire feeder. The spindles 124a, 126a are located on opposite lateral sides of the reel stand 130. In certain embodiments, the reel stand 130 can include a lift bail 132 for suspending the reel stand.

Although the example embodiments shown in the figures depict wire feeders and reel stands for dual wire welding systems, it is to be appreciated that the wire feeders and reel stands could be configured to drive and/or support more than two wire electrodes, such as 3, 4 or more than 4 wire electrodes. Further details regarding the structure of welding wire feeders can be found in U.S. Pat. No. 5,816,466 issued on Oct. 6, 1998 and U.S. Pat. No. 8,569,653 issued on Oct. 29, 2013, both of which are incorporated herein by reference.

Figure 7:
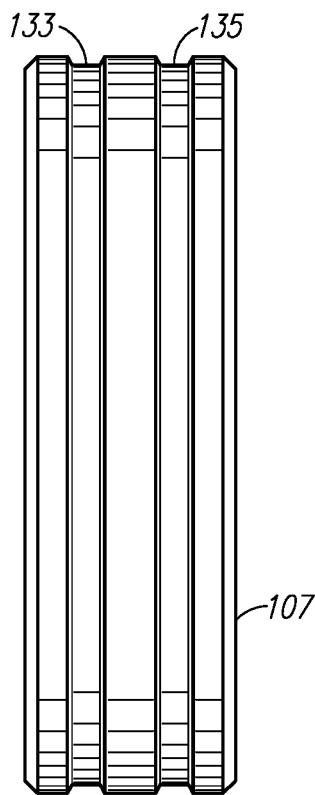
FIG. 7 illustrates an example drive roll.
Figure 8:
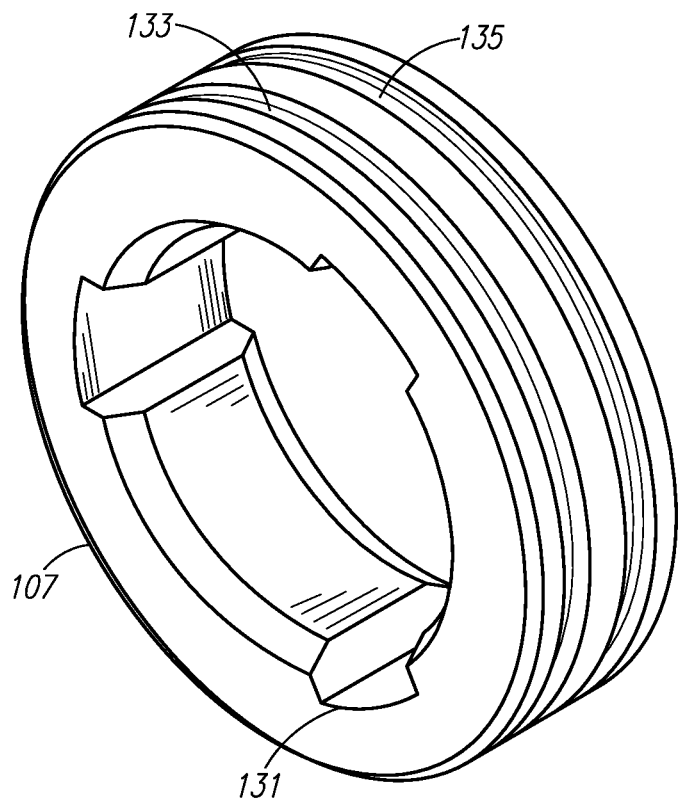
FIG. 8 is a perspective view of the example drive roll.
Figure 9:
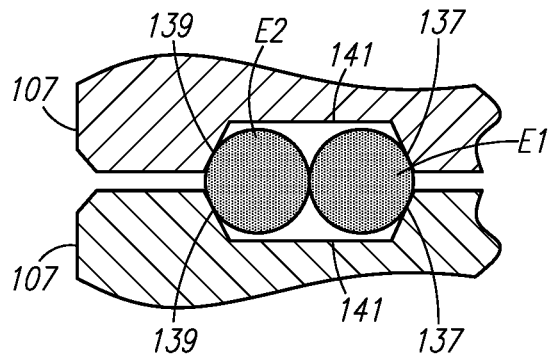
FIG. 9 illustrates a cross section of drives rolls feeding dual wires.

FIGS. 7 and 8 illustrate an example drive roll 107. The drive roll has a central bore. The inner surface of the bore can include contoured recesses 131 for receiving projections on a driving mechanism, such as a drive gear, to transfer drive torque to the drive roll 107. The drive roll 107 includes one or more annular or circumferential wire receiving grooves 133, 135. The wire receiving grooves 133, 135 are spaced axially along the circumference of the drive roll 107. The wire receiving grooves 133, 135 are designed to receive two welding wires. Example standard welding wire diameters for use with the drive rolls 107 include 0.030 inches, 0.035 inches, 0.040 inches, 0.045 inches, etc. The wire receiving grooves 133, 135 can have the same width and depth as each other, or have different widths and depths to accommodate different sizes or combinations of dual welding wires. If the wire receiving grooves 133, 135 each have the same width and depth, then the drive roll 107 can be reused when one groove is worn out by simply flipping the drive roll over and reinstalling it on the wire feeder. The wire receiving grooves 133, 135 can be configured to simultaneously drive two wires having the same diameter, or two wires having different diameters. In FIG. 7, the wire receiving grooves 133, 135 have a trapezoidal shape with straight, angled or inwardly-tapered sidewalls and a central portion that is configured as flat base extending between the sidewalls. However, the wire receiving grooves 133, 135 could have other shapes besides a trapezoidal shape, such as having a curved, concave central portion or groove base for example. In certain embodiments, the grooves 133, 135 can include knurling or other frictional surface treatments to help grip the welding wires.

FIGS. 9 through 14 show partial cross sections of example drive rolls 107 as they would be mounted on a wire feeder for supplying dual welding wires. The drive rolls 107 are biased together to provide a clamping force on the first E1 and the second E2 welding wires. The welding wires E1, E2 are both located in the annular grooves of the upper and lower drive rolls 107. The annular grooves are aligned and can have a trapezoidal shape. In FIG. 6, the trapezoidal shape is an isosceles trapezoid formed by an inner sidewall 137, an outer sidewall 139, and a groove base 141 extending between the sidewalls. The isosceles trapezoidal shape is inverted as a cross-sectional recess from the outer circumferential surface of the drive rolls 107.

Due to the bias force applied to the drive rolls 107, the welding wires E1, E2 are clamped in the annular grooves between upper and lower sidewalls 137, 139 forming the grooves and the neighboring welding wire. The welding wires E1, E2 are stably held via three points of contact within the annular grooves. This clamping system can allow both wires to be fed through the wire feeder in a consistent manner. The two welding wires E1, E2 support each other during feeding and pull each other along via friction.

Because the inner 137 and outer 139 sidewalls of the annular grooves are angled, they apply both vertical and horizontal clamping forces on the welding wires E1, E2. The horizontal clamping force pushes the welding wires E1, E2 together, causing them to contact each other between the grooves on the upper and lower rolls 107. In certain embodiments, the welding wires E1, E2 are clamped within the annular grooves so as to be radially offset from the central portions of the grooves, e.g., radially offset from the groove bases 141. That is, the welding wires E1, E2 are pinned between each other and the angled sidewalls 137, 139 of the grooves such that gaps exist between the welding wires and the groove bases 141. This can be seen clearly in FIG. 9.

Figure 10:
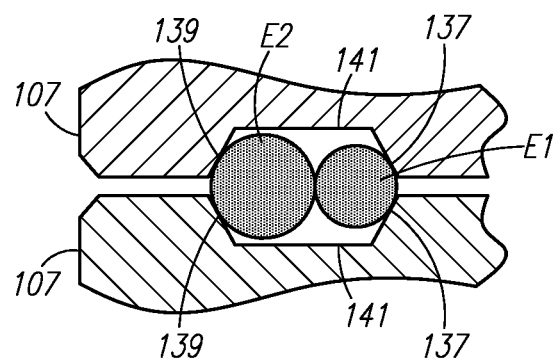
FIG. 10 illustrates a cross section of drives rolls feeding dual wires.

The clamping system discussed above allows for some variability (e.g., due to manufacturing tolerances) in the diameters of the welding wires E1, E2. If each welding wire E1, E2 had its own dedicated annular groove in the drive rolls 107, and one of the welding wires was slightly larger than the other, then the smaller welding wire might not be adequately clamped between the drive rolls. In such a situation, the larger welding wire would limit the radial displacement of the drive rolls 107 toward each other, thereby preventing proper clamping of the smaller wire. This could lead to feeding problems and so-called birdnesting of the smaller welding wire during feeding. The clamping system discussed above can accommodate wires of different sizes because the clamping system is self-adjusting. As can be seen in FIG. 10, when one welding wire E1 is larger than the other E2, the contact point between the wires is shifted axially from a central position within the annular grooves toward the smaller wire. Three points of contact are maintained on each welding wire E1, E2 by the sidewalls 137, 139 of the groove and the neighboring welding wire.

Figure 11:
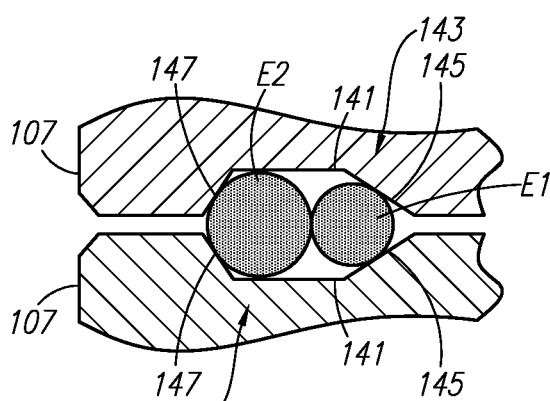
FIG. 11 illustrates a cross section of drives rolls feeding dual wires.
Figure 12:
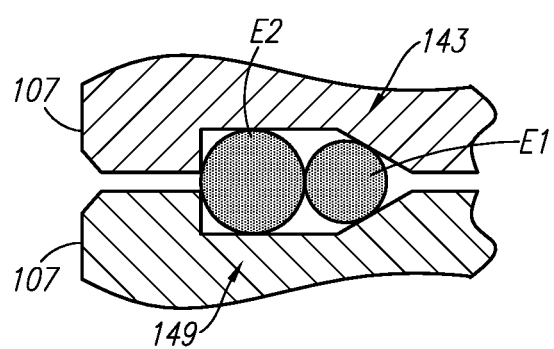
FIG. 12 illustrates a cross section of drives rolls feeding dual wires.
Figure 13:
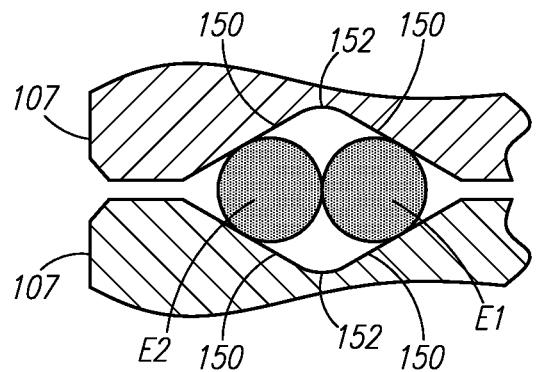
FIG. 13 illustrates a cross section of drives rolls feeding dual wires.

FIG. 11 shows drive rolls 107 having annular grooves 143 with cross sections having an acute trapezoid shape instead of an isosceles trapezoid. The inner 145 and outer 147 sidewalls of the grooves have different lengths and form different angles with the outer circumferential surface of the drive rolls. In FIG. 12, the drive rolls 107 have annular grooves 149 having a right trapezoid shape. Acute and right trapezoidal grooves can accommodate greater differences in welding wire diameters than isosceles trapezoids. Thus, acute and right trapezoidal grooves can be used when the groove is intended to drive welding wires having different diameters, such as a 0.040 inch welding wire with a 0.045 inch welding wire. In certain embodiments, the sidewalls and/or base of the grooves can be curved (e.g., concave or convex). Also, the inside corner transitions between the sidewalls and the base of the trapezoidal grooves can be curved or radiused. FIG. 13 shows example drive rolls having annular grooves with straight, angled sidewalls 150 joined by a concave curved or radiused central portion (e.g., groove base 152). In an example embodiment, the angle between the sidewalls 150 and the outer circumference of the drive roll 107 is about 150°, although other angles are possible and can be determined with sound engineering judgment.

Figure 14:
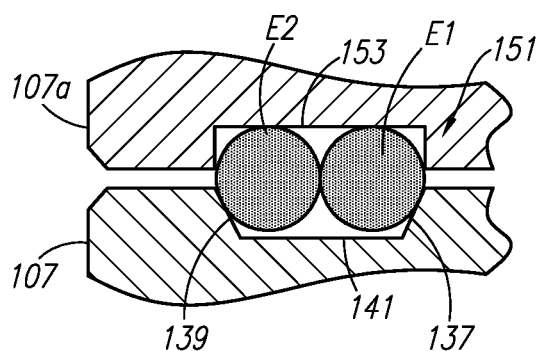
FIG. 14 illustrates a cross section of drives rolls feeding dual wires.

FIG. 14 shows an example embodiment in which one drive roll 107 has a trapezoidal groove for the welding wires E1, E2, and the other drive roll 107a has a non-trapezoidal groove. In FIG. 14, the non-trapezoidal groove is rectangular in shape, however other shapes are possible. For example, the non-trapezoidal groove could be curved, such as elliptical or rounded in shape. Further, the trapezoidal groove is shown as being located on the lower drive roll 107. However, the trapezoidal groove could be located on the upper drive roll 107a and the non-trapezoidal groove located on the lower drive roll. The welding wires E1, E2 are clamped between respective sidewalls 137, 139 of the trapezoidal groove and the base 153 of the non-trapezoidal groove 151, and the welding wires are forced into contact with each other as discussed above. Thus, the welding wires E1, E2 are stably held via three points of contact within the annular grooves 107, 107a.

Figure 15:
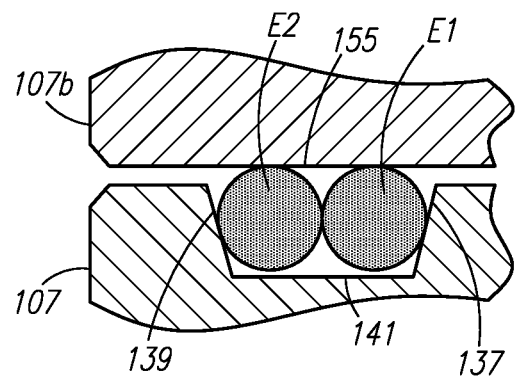
FIG. 15 illustrates a cross section of drives rolls feeding dual wires.

FIG. 15 shows an example embodiment in which one drive roll 107 has a trapezoidal groove for the welding wires E1, E2, and the other drive roll 107b has no groove, but rather directly contacts the welding wires on its outer circumferential surface 155. The trapezoidal groove is shown as being located on the lower drive roll 107. However, the trapezoidal groove could be located on the upper drive roll. The welding wires E1, E2 are clamped between respective sidewalls 137, 139 of the trapezoidal groove and the outer circumferential surface 155 of the upper drive roll 107b, and the welding wires are forced into contact with each other as discussed above. Thus, the welding wires E1, E2 are stably held via three points of contact.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding or additive manufacturing wire drive system, comprising:
   a first spindle for a first welding wire spool;
   a second spindle for a second welding wire spool;
   a first drive roll;
   a second drive roll, wherein one or both of the first drive roll and the second drive roll has a circumferential groove;
   a first welding wire, from the first welding wire spool, located between the first drive roll and the second drive roll in the circumferential groove; and
   a second welding wire, from the second welding wire spool, located between the first drive roll and the second drive roll in the circumferential groove,
   wherein the first welding wire contacts the second welding wire between the first drive roll and the second drive roll, and the first welding wire further contacts a first sidewall portion of the circumferential groove, and the second welding wire further contacts a second sidewall portion of the circumferential groove, and
   wherein both of the first welding wire and the second welding wire are radially offset from a central portion of the circumferential groove, and the first welding wire is clamped by the first sidewall portion of the circumferential groove against the second welding wire so as to be clamped offset from the central portion of the circumferential groove, and the second welding wire is clamped by the second sidewall portion of the circumferential groove against the first welding wire so as to be clamped offset from the central portion of the circumferential groove.

2. The welding or additive manufacturing wire drive system of claim 1, wherein the central portion of the circumferential groove is concave.

3. The welding or additive manufacturing wire drive system of claim 1, wherein the first welding wire and the second welding wire have different diameters.

4. The welding or additive manufacturing wire drive system of claim 1, wherein the first spindle and the second spindle are located on opposite lateral sides of a reel stand.

5. The welding or additive manufacturing wire drive system of claim 1, wherein the first spindle and the second spindle are located on a common lateral side of a reel stand.

6. The welding or additive manufacturing wire drive system of claim 5, wherein:
the first welding wire spool is located above the second welding wire spool on the reel stand,
the first drive roll and the second drive roll rotate to simultaneously payout the first welding wire from the first welding wire spool and payout the second welding wire from the second welding wire spool, and
the first welding wire spool and the second welding wire spool rotate in opposite directions during payout.

7. A welding or additive manufacturing wire drive system, comprising:
a first spindle for a first welding wire spool;
a second spindle for a second welding wire spool;
a first drive roll having a first circumferential groove comprising a first inner sidewall, a first outer sidewall, and a first concave groove base extending between the first inner sidewall and the first outer sidewall;
a second drive roll having a second circumferential groove comprising a second inner sidewall, a second outer sidewall, and a second concave groove base extending between the second inner sidewall and the second outer sidewall, wherein the second circumferential groove is aligned with the first circumferential groove;
a first welding wire, from the first welding wire spool, located between the first drive roll and the second drive roll in both of the first circumferential groove and the second circumferential groove;
a second welding wire, from the second welding wire spool, located between the first drive roll and the second drive roll in both of the first circumferential groove and the second circumferential groove; and
a biasing member that biases the first drive roll toward the second drive roll to force the first welding wire to contact the second welding wire, wherein:
the first welding wire contacts each of the first inner sidewall, the second inner sidewall, and the second welding wire,
the second welding wire contacts each of the first outer sidewall, the second outer sidewall, and the first welding wire,
the first welding wire is clamped by the first inner sidewall, the second inner sidewall, and the second welding wire so as to be clamped offset from both of the first concave groove base and the second concave groove base, and
the second welding wire is clamped by the first outer sidewall, the second outer sidewall, and the first welding wire so as to be clamped offset from both of the first concave groove base and the second concave groove base.

8. The welding or additive manufacturing wire drive system of claim 7, wherein the first welding wire and the second welding wire have different diameters.

9. The welding or additive manufacturing wire drive system of claim 7, wherein the first spindle and the second spindle are located on opposite lateral sides of a reel stand.

10. The welding or additive manufacturing wire drive system of claim 7, wherein the first spindle and the second spindle are located on a common lateral side of a reel stand.

11. The welding or additive manufacturing wire drive system of claim 10, wherein:
one of the first welding wire spool and the second welding wire spool is located above the other one of the first welding wire spool and the second welding wire spool on the reel stand,
the first drive roll and the second drive roll rotate to simultaneously payout the first welding wire from the first welding wire spool and payout the second welding wire from the second welding wire spool, and
the first welding wire spool and the second welding wire spool rotate in opposite directions during payout.

* * * * *